US012594715B2

(12) United States Patent
Wu et al.

(10) Patent No.: US 12,594,715 B2
(45) Date of Patent: Apr. 7, 2026

(54) 3D PRINTING DEVICE, AND METHOD FOR PREPARING 3D PRINTED STRUCTURE

(71) Applicant: INSTITUTE OF CHEMISTRY, CHINESE ACADEMY OF SCIENCES, Beijing (CN)

(72) Inventors: Lei Wu, Beijing (CN); Yanlin Song, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 18/999,708

(22) Filed: Dec. 23, 2024

(65) Prior Publication Data

US 2025/0121555 A1 Apr. 17, 2025

Related U.S. Application Data

(62) Division of application No. 17/431,244, filed as application No. PCT/CN2019/076789 on Mar. 4, 2019, now abandoned.

(30) Foreign Application Priority Data

Feb. 18, 2019 (CN) .......................... 201910120618.4

(51) Int. Cl.
*B29C 64/112* (2017.01)
*B33Y 10/00* (2015.01)

(52) U.S. Cl.
CPC ............ *B29C 64/112* (2017.08); *B33Y 10/00* (2014.12)

(58) Field of Classification Search
CPC ... B29C 64/112; B29C 64/209; B29C 64/232; B29C 64/343; B33Y 10/00
See application file for complete search history.

(56) References Cited

U.S. PATENT DOCUMENTS

2014/0353878 A1* 12/2014 Driessen ............... B29C 64/129
264/401
2018/0333913 A1* 11/2018 Lin ........................ B29C 64/264

* cited by examiner

*Primary Examiner* — Galen H Hauth
*Assistant Examiner* — John Robitaille
(74) *Attorney, Agent, or Firm* — Maine Cernota & Curran

(57) ABSTRACT

Disclosed are a 3D printing device, and a method for preparing a 3D printed structure. The device comprises a curing system (1), and a curing pattern player (6), a flat curing surface (2) with dewettability, and a receiving base (4) capable of moving upwards and away from the flat curing surface, with same being successively arranged above the curing system (1), wherein a curing medium provided by the curing system (1) passes through the curing pattern, so that ink between the flat curing surface (2) and the receiving base (4) is cured.

14 Claims, 1 Drawing Sheet

3D PRINTING DEVICE, AND METHOD FOR PREPARING 3D PRINTED STRUCTURE

RELATED APPLICATIONS

The present application is a divisional of U.S. patent application Ser. No. 17/431,244, filed Aug. 16, 2021 as a national phase application under 35 USC § 371 of PCT Application No. PCT/CN2019/076789, with an international filing date of Mar. 4, 2019. PCT/CN2019/076789 claims priority to the Chinese Patent Application No. 201910120618.4, filed on Feb. 18, 2019. All of these applications are herein incorporated by reference in their entirety for all purposes.

FIELD OF THE INVENTION

The present disclosure relates to the field of 3D printing, and in particular to a 3D printing device and a method of producing a 3D printed structure.

BACKGROUND OF THE INVENTION 3D printing, also known as an additive manufacturing technology, is a kind of rapid prototyping technology which constructs a three-dimensional object by means of dot-by-dot or layer-by-layer printing on the basis of digital model files. The 3D printing techniques up to now can be categorized into melt extrusion rapid prototyping, photocuring stereoscopic molding, digital light processing, foil stack fabrication, ink-jet 3D printing, selective laser sintering, electron beam melt fabrication, and solidification molding by special initiation means, according to the principles of three-dimensional prototyping. As compared with the traditional manufacturing industry, the 3D printing techniques do not require the mold fabrication or machining process and can avoid waste of material and energy during the conventional subtractive manufacturing processes. The 3D printing method based on initiation and solidification occupies an absolute dominance of the novel 3D printed materials, and exhibits an inherent and unique advantage in the preparation of high-precision structures. Its initiation and solidification process by applying the curable liquids as inks allows the growth of to-be-printed structures from liquid materials, thereby exploring the new sensor technologies, novel drug delivery technologies and new lab-on-a-chip applications. Despite these advantages, the current solidification-initiated 3D printing methods have the deficiency that the utilization ratio of curable liquid materials is still low, and a majority of the liquid materials are wasted instead of being converted into the desired structures.

After years of research finding, it has been discovered that many processes such as chemical reactions, nanoparticle assembly are prone to occur at the position of solid-liquid-gas three-phase contact line, CN102627028A discloses a method for preparing high-resolution pattern based on spontaneous dewetting of ink droplet, specifically, inorganic nano particles, metal nano particles, organic nano particles or polymers are dispersed in a dispersing agent to obtain ink having a solid content within a range of 0.0000001-70 wt %, the resulting ink then is received in a cartridge of the ink-jet printing equipment, the ink is ink-jetted onto a base material with dewettability. The method can cause the three-phase contact line of the ink droplets to spontaneously dewet and retract to produce high-resolution patterns by using the substrate with dewettability, but a use of the print cartridge (resin tank) is required during the printing process, the solid content of the ink is subjected to a certain requirement, which cannot be more than 70 wt. %, resulting in low utilization rate of curable liquid material (3D printing raw material); in addition, the employment of a large liquid environment causes the liquid material to form a large amount of residues on the substrate surface, and the liquid retains in pores of the cured structure brings about a problem that the printed structure cannot be easily cleaned, and causing a reduced printing precision during the curing process, and the printed structure can be easily defective.

SUMMARY OF THE INVENTION

An object of the present disclosure is to overcome the problems in the prior art that the utilization rate of 3D printing raw materials is low, the printing precision is reduced, the printed structure cannot be easily cleaned and is prone to be defective, and to provide a 3D printing device and a method for producing a 3D printed structure, such that the 3D printed structure produced with the 3D printing device and the method of the present disclosure has a high raw material utilization rate, high printing precision and a desirable molding effect, and can be easily cleaned.

In order to achieve the above-mentioned object, a first aspect of the present disclosure provides a 3D printing device, wherein the device comprises a curing system, and a curing pattern player, a flat curing surface with dewettability, and a receiving base capable of moving upwards and away from the flat curing surface, with same being successively arranged above the curing system, wherein:

the flat curing surface is used for placing ink droplets;

the curing pattern player is used for projecting patterns that reflect different structural layers of a target 3D printing structure; and a curing medium provided by the curing system passes through the curing pattern, so that the ink liquid between the flat curing surface and the receiving base are cured.

Preferably, the 3D printing device further comprises a movement system coupled to the receiving base for moving upwards the receiving base.

Preferably, the 3D printing device further comprises a computer for controlling the curing pattern player to project the curing pattern.

Preferably, the curing system comprises one or more of a light-initiated curing device, a thermally initiated curing device and an electrically initiated curing device.

In a second aspect, the present disclosure provides a method of producing a 3D printed structure with the aforementioned device, the method comprises the following steps:

(A) placing ink droplets on a surface of the flat curing surface with dewettability, and passing the receiving base through the ink droplets such that the lower end surface of the receiving base is brought into proximity with the flat curing surface;

(B) arranging the curing pattern player to project a curing pattern, a curing medium provided by the curing system passes through the curing pattern, so that the ink droplets filled between the flat curing surface and the receiving base are cured, in order to form a cured layer with the curing pattern; and (C) moving upwards the receiving base, causing the curing pattern player to project the curing patterns that reflect the different structural layers of a target 3D printed structure, and repeating the curing process in step (B), thereby forming a 3D printed structure through a layer-by-layer growth.

Preferably, the adhesive force between the cured layer and the flat curing surface is less than 20 kPa, preferably less than 15 kPa, more preferably less than 10 kPa.

Preferably, the dynamic contact angle between the ink droplet and the flat curing surface is lower than or equal to 30°, further preferably lower than or equal to 20°, more preferably lower than or equal to 10°.

Compared to the conventional preparation method using a resin tank (print cartridge), the present disclosure is based on the dewettability of ink droplets, uses the single curable ink droplet as a raw material, and de-wets by curing and inducing the three-phase contact line of the ink droplet, and completely solidifies the single ink droplet to form a 3D printed structure, which improves the utilization rate of the printing liquid material due to a higher curable component in the ink droplet, and in a preferred embodiment, for example, in the case where the adhesive force between the cured layer and the flat curing surface is less than 20 kPa, and the dynamic contact angle between the ink droplet and the flat curing surface is lower than or equal to 30°, the dry material utilization rate (a ratio of the weight of the 3D printed structure to the weight of the ink droplet) can reach 80% or more; in addition, due to the high content of the solidifiable component, the residual liquid on a surface of the cured layer (the already cured structure) is relatively less, thereby improving the print precision, the prepared 3D printed structure can be easily cleaned, the molding result is desirable, and the 3D printed structure has less defect.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DESCRIPTION OF REFERENCE SIGNS

Figure 1:
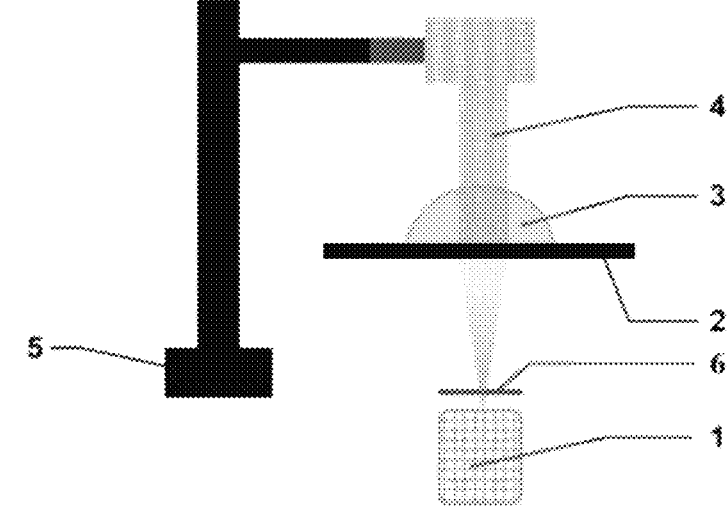
FIG. 1 illustrates a schematic diagram that the present disclosure performs 3D printing by photo-curing and/or thermal curing.

1. Curing system
2. Flat curing surface
3. Ink droplets
4. Receiving base
5. Movement system
6. Curing pattern player

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

Figure 2:
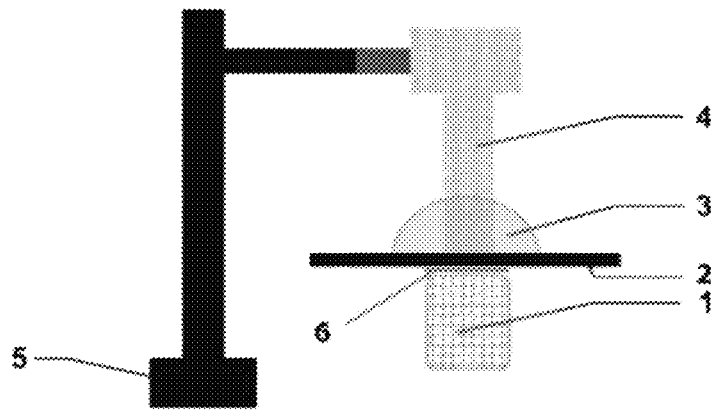
FIG. 2 illustrates a schematic diagram that the present disclosure performs 3D printing by electrical curing.

In a first aspect, the present disclosure provides a 3D printing device, as shown in FIG. 1 and FIG. 2, the device comprising a curing system 1, and a curing pattern player 6, a flat curing surface 2 with dewettability, and a receiving base 4 capable of moving upwards and away from the flat curing surface, with same being successively arranged above the curing system 1, wherein:

the flat curing surface 2 is used for placing ink droplets;

the curing pattern player 6 is used for projecting curing patterns that reflect different structural layers of a target 3D printing structure; and a curing medium provided by the curing system 1 passes through the curing pattern, so that the ink liquid between the flat curing surface and the receiving base are cured.

In the present disclosure, the ink liquid refers to a portion of ink droplets, and the total amount of ink liquid is the amount of ink droplets.

In the present disclosure, a curing medium provided by the curing system passes through the curing pattern for many times, so as to cure the ink droplet for many times, and form a 3D printed structure on the lower end surface of the receiving base by curing for many times and growing layer by layer. The curing medium provided by the curing system passes through the curing pattern for each time to cure a portion of ink liquid of the ink droplet, form a layer of curing pattern, such that each layer of curing pattern has the same graph as the curing pattern projected by the curing pattern player during a process of forming the pattern. The first curing relates to forming a first cured layer having the same pattern as the first curing pattern on the lower end surface of the receiving base, moving upwards the receiving base having formed the first cured layer and switch the curing pattern player to project the second curing pattern; the second curing relates to forming a second cured layer on a surface of the first cured layer, moving upwards the receiving base having formed the first cured layer and the second cured layer and switch the curing pattern player to project the third curing pattern; the third curing relates to forming a third cured layer on a surface of the second cured layer, that is, the next curing is performed on the cured layer formed by the previous curing process, and the curing process is repeated for many times to form the 3D printed structure through the layer-by-layer growth.

In a preferred embodiment of the present disclosure, the 3D printing device further comprises a movement system 5 which is coupled to the receiving base 2 for moving upwards the receiving base. After forming a layer of curing pattern by each time of curing, the receiving base is moved upwards by the movement system.

In the present disclosure, the 3D printing device further comprises a computer for controlling the curing pattern player to project the curing pattern. Specifically, the computer is used for controlling the curing pattern player to project and switch a curing pattern.

In the present disclosure, the curing system comprises one or more of a light-initiated curing device, a thermally initiated curing device and an electrically initiated curing device. A schematic diagram of performing 3D printing with an optical medium provided by the photo-initiated curing device may be as shown in FIG. 1, a schematic diagram of performing 3D printing with a thermal medium provided by the thermally initiated curing device may be as shown in FIG. 1, and a schematic diagram of performing 3D printing with an electrical medium provided by the electrically initiated curing device may be illustrated in FIG. 2.

In the present disclosure, the curing medium refers to one or more selected from the group consisting of light provided by a photo-initiated curing device, heat provided by a thermally initiated curing device, and electricity provided by an electrically initiated curing machine.

In a second aspect, the present disclosure provides a method of producing a 3D printed structure with the aforementioned device, the method comprises the following steps:

(A) placing ink droplets on a surface of the flat curing surface with dewettability, and passing the receiving base through the ink droplets such that the lower end surface of the receiving base is brought into proximity with the flat curing surface;

(B) arranging the curing pattern player to project a curing pattern, a curing medium provided by the curing system passes through the curing pattern, so that the ink liquid filled between the flat curing surface and the receiving base are cured, in order to form a cured layer with the curing pattern; and (C) moving upwards the receiving base, causing the curing pattern player to project the curing patterns that reflect the different structural layers of a target 3D printed structure, and repeating the curing process in step (B), thereby forming a 3D printed structure through a layer-by-layer growth.

According to the method of the present disclosure, the term "proximity" in step (A) means that ink liquid is filled between the lower end surface of the receiving base and the flat curing surface, and the amount of ink liquid is sufficient to satisfy and form the cured layer of step (B).

In accordance with the method of the present disclosure, the lower end surface of the receiving base may be a planar structure, an area of the planar structure shall fulfill the purpose of forming a robust curing layer, the area is preferably not lower than the area of the first cured layer of step (B).

According to the method of the present disclosure, the target 3D print structure refers to a 3D print structure to be printed.

According to the method of the present disclosure, the adhesive force between the cured layer and the flat curing surface is less than 20 kPa, preferably less than 15 kPa, more preferably less than 10 kPa. For example, the adhesive force between the cured layer and the flat curing surface is 9 kPa, 8 kPa, 7 kPa, 6 kPa, 5 kPa, 4 kPa, 3 kPa, 2 kPa, 1 kPa, 0.8 kPa, 0.5 kPa, 0.3 kPa, 0.1 kPa, 0.01 kPa, etc.

In accordance with the method of the present disclosure, the speed of moving upwards the receiving base is a product of the speed of switching the curing pattern multiplying with the thickness value of the cured layer. For example, the second cured layer is formed when the curing pattern player switches the second curing pattern, the speed of moving upwards the receiving base is a product of the switching speed of the second curing pattern multiplying with the thickness value of the second cured layer. Specifically, for example, if the second cured layer has a thickness of 10 μm/layer, the switching speed of the second curing pattern is 5 layer/second, and the speed of moving upwards the receiving base is 50 μm/s. In another example, if the fifth cured layer has a thickness of 5 μm/layer, and the switching speed of the fifth curing pattern is 1 layer/second, the speed of moving upwards the receiving base is 5 μm/s.

The receiving base is moved upwards in step (C), and cured layer formed in step (B) "sticks" on the lower end surface of the receiving base so as to be jointly moved upwards. The gap formed between the cured layer and the flat curing surface is filled with ink liquid which is applied as a raw material for the next curing. The curing is performed layer by layer and implemented continuously according to the same mode. The receiving base is moved upwards continuously, and the stacked 3D printed structure is grown layer by layer down wards and continuously on the lower end surface of the receiving base.

According to a preferred embodiment of the present disclosure, the switching speed of the curing pattern is within a range of 1-20 layer per second, preferably 1-5 layer per second.

According to a preferred embodiment of the present disclosure, the cured layer has a thickness within a range of 1-20 μm/layer, preferably 5-10 mm/layer.

According to the method of the present disclosure, the dynamic contact angle between the ink droplet and the flat curing surface is arranged such that it is possible to retract and de-wet after moving upwards the receiving base, for example, the dynamic contact angle between the ink droplet and the flat curing surface is lower than or equal to 30°, preferably lower than or equal to 20°, more preferably lower than or equal to 10°, and a dynamic contact angle between the ink droplet and the flat curing surface may be 5.2±1.4°, 3.9±2.1°, 2.2±0.6°, 1.2±0.5°. Wherein, the term "dynamic contact angle" refers to the difference between the advancing contact angle and the receding contact angle when the ink droplet starts to slide or roll on a solid surface.

The method of the present disclosure does not impose specific limitation on the static contact angle between the ink droplet and the flat curing surface, for example, the static contact angle between the ink droplet and the flat curing surface may be 152.4±3.5°, 59.4±2.7°, 42.4±2.1°, 39.4±1.8°. The term "static contact angle" herein refers to the angle between the boundary line of the gas-liquid and the boundary line of the liquid-solid when the ink droplet reaches equilibrium on a solid surface, the angle is called as the contact angle.

According to the method of the present disclosure, the method of curing includes, but is not limited to, one or more selected from the group consisting of photo-curing, thermal curing and electrical curing. A schematic diagram of performing 3D printing by photo-curing and/or thermal curing may be as shown in FIG. 1, and a schematic diagram of performing 3D printing by electro-curing may be as illustrated in FIG. 2.

According to an embodiment of the present disclosure, the photo-curing may have a light emission wavelength within a range of 200-1,000 nm, preferably within a range of 300-450 nm. In particular, the photo-curing is a curing process with ink droplet initiated by a light having a light emission wavelength within a range of 200-1,000 nm, preferably within a range of 300-450 nm, wherein the ink droplet contains a light-curable resin, and by arranging a curing pattern such that the ink liquid being identical with the curing pattern is cured, the remaining uncured ink liquid is allowed to de-wet and retract along with the rising of the receiving base, the volume of the ink liquid is gradually consumed as it is cured to form a solid structure, and the three phase contact line of the ink droplet may retract and de-wet simultaneously at the cured layer (the cured structure) and the flat curing surface, thereby de-wetting the individual curable print ink droplet and completely curing the ink droplet into the 3D printed structure.

According to another embodiment of the present disclosure, the temperature of thermal curing is within a range of 30° C.-1,500° C., preferably within a range of 30° C.-300° C. Specifically, the thermal curing refers to initiating ink droplet at a temperature of 30° C.-1,500° C., preferably 30° C.-300° C. to carry out curing, wherein the ink droplet contains a thermosetting resin or a liquid metal, and by arranging a curing pattern such that the ink liquid being identical with the curing pattern is cured, the remaining uncured ink liquid is allowed to de-wet and retract along with the rising of the receiving base, the volume of the ink liquid is gradually consumed as it is cured to form a solid structure, and the three phase contact line of the ink droplet may retract and de-wet simultaneously at the cured layer (the cured structure) and the flat curing surface, thereby de-wetting the individual curable print ink droplet and completely curing the ink droplet into the 3D printed structure.

In accordance with another embodiment of the present disclosure, the conditions of electrical curing comprise: direct current or alternating current with a voltage of 12V to 220V, static electricity with a touch discharge voltage greater than 8 kV, or static electricity with an air discharge voltage larger than 15 kV; preferably, static electricity with a touch discharge voltage within a range of 8-20 kV, or static electricity with an air discharge voltage within a range of 15-30 kV. Specifically, the curing of the ink droplet is initiated under conditions of static electricity with a touch discharge voltage greater than 8 kV, or static electricity with an air discharge voltage larger than 15 kV; preferably, static electricity with a touch discharge voltage within a range of 8-20 kV, or static electricity with an air discharge voltage within a range of 15-30 kV, wherein the liquid ink containing free ions in the ink droplet cured the ink liquid being identical with the curing pattern by arranging the curing pattern, and the remaining uncured ink liquid is allowed to de-wet and retract along with the rising of the receiving base, the volume of the ink liquid is gradually consumed as it is cured to form a solid structure, and the three phase contact line of the ink droplet may retract and de-wet simultaneously at the cured layer (the cured structure) and the flat curing surface, thereby de-wetting the individual curable print ink droplet and completely curing the ink droplet into the 3D printed structure.

According to the method of the present disclosure, the ink droplets may be one or more selected from the group consisting of a liquid ink containing free ions, a photo-curable resin, a thermosetting resin and a liquid metal.

According to the method of the present disclosure, the free ions are one or more selected from the group consisting of metal ions, inorganic ions and organic ions, and the liquid ink is an aqueous solution, a non-aqueous solution or a molten salt; further preferably, the free ions are one or more selected from the group consisting of gold ions, silver ions, copper ions and iron ions. For example, an aqueous solution of gold chlorate.

According to the method of the present disclosure, the photo-curable resin has a photosensitive wavelength within a range of 200-1,000 nm, preferably 300-450 nm, and preferably the photo-curable resin is one or more selected from the group consisting of polymethyl methacrylate, polyacrylic resin, epoxy acrylic resin, polyurethane acrylic resin, polyester acrylic resin, polyether acrylic resin, phenolic resin, a pre-polymer of acrylonitrile-butadiene styrene (ABS) copolymer, silicone hydrogel resin, allyl resin and vinyl resin.

According to the method of the present disclosure, the thermosetting resin has a heat-sensitive temperature within a range of 30° C.-1,500° C., preferably 30° C.-300° C.;

preferably, the thermosetting resin is one or more selected from the group consisting of polymethyl methacrylate, polyacrylic resin, epoxy resin, epoxy acrylic resin, polyurethane acrylic resin, polyester acrylic resin, polyether acrylic resin, phenolic resin, acrylonitrile-butadiene-styrene (ABS) resin, silicone hydrogel resin, allyl resin and vinyl resin.

According to the method of the present disclosure, the liquid metal could be metals having low-melting-point. For example, the liquid metal is one or more selected from the group consisting of liquid bismuth (Bi), liquid Stannum (Sn), liquid Plumbum (Pb), liquid Indium (In), and liquid Gallium (Ga).

According to the method of the present disclosure, the material of flat curing surface may be obtained by physically compounding and/or chemically crosslinking a silicone rubber and a surfactant, wherein the silicone rubber is not particularly limited. The surfactant may be a fluorine-free or fluorine-containing surfactant. Specifically, the fluorine-containing surfactant may be one or more selected from the group consisting of a compound having a fluorocarbon-based backbone or side chain structure, a fluorine-containing liquid and a fluorine-containing solid, such as a long-chain alkane having a side chain substituted with a fluorine atom, and more specifically, the fluorine-containing surfactant may be heptadecafluoro-decyl-trimethoxysilane, (trifluoromethyl) trimethylsilane, triethylfluorosilane, and 1,1,1,2,2,4, 5,5,5-nonafluoro-4-(trifluoromethyl)-3-pentanone, and the like. The fluorine-free surfactant may be one or more selected from the group consisting of a compound having a carbon chain-based backbone or side chain structure, an organic liquid or a solid, such as a long-chain alkane, n-hexadecane, n-eicosane, and the like. The ratio relationship between the silicone rubber and the surfactant is not particularly limited, it may be 1:1, 10:1, 100:1, for example.

Alternatively, the flat curing surface may be a superbiconphobic surface with a Re-entrant (overhang) structure. The Re-entrant structure may be an arrayed structure or a non-arrayed structure obtained by micromachining etching, chemical etching, or particle deposition. In the present disclosure, the term "superbiconphobic surface" refers to a surface having a contact angle greater than 150° in regard to both water and an organic liquid. The preparation method of the Re-entrant structure pertains to the conventional method in the art, the content will not be repeated herein.

According to the method of the present disclosure, the receiving base may be moved by a movement system such that the receiving base can be moved in accordance with the target 3D printed structure.

In line with an embodiment of the present disclosure, the 3D printing method comprises the following steps, as shown in FIG. 1 and FIG. 2:

(1) obtaining a STL file of the target 3D printing and selecting curable print ink droplets, calculating the weight of the desired 3D print ink droplets based on the dimensional parameters of the STL file and the density of the ink droplets, placing the ink droplets with corresponding weight on a surface of a flat curing surface with dewettability, controlling the receiving base to pass through the ink droplets by a movement system such that the lower end surface of the receiving base is brought into proximity with the flat curing surface;

(2) arranging a curing pattern player to project a first curing pattern, a curing medium provided by the curing system passes through the first curing pattern, so that the ink liquid filled between the flat curing surface and the receiving base are cured, so as to form a first cured layer having the first curing pattern; and (3) moving upwards the receiving base, switching a curing pattern of the curing pattern player according to the target 3D printing structure, projecting a second curing pattern, a curing medium provided by the curing system passes through the second curing pattern, so that the ink liquid filled between the flat curing surface and the first cured layer are cured, so as to form a second cured layer having the second curing pattern.

Moving upwards the receiving base, switching the curing pattern of the cured pattern player according to the target 3D printing structure, projecting a third curing pattern, a curing medium provided by the curing system passes through the third curing pattern, so that the ink liquid filled between the flat curing surface and the second cured layer are cured, so as to form a third cured layer having the third curing pattern.

Moving upwards the receiving base, switching the curing pattern of the cured pattern player according to the target 3D printing structure, projecting a fourth curing pattern, a curing medium provided by the curing system passes through the fourth curing pattern, such that the ink liquid filled between the flat curing surface and the third cured layer are cured, so as to form a fourth cured layer having the fourth curing pattern.

The curing pattern player is enabled to project a curing pattern reflecting the different structural layers of the target 3D printed structure, and the curing process is repeated in order to form the 3D printed structure obtained through the layer-by-layer growth.

According to an embodiment of the present disclosure, the use of the above-mentioned method for preparing teeth comprises the steps of:

(1) obtaining a 3D printing STL file of a desired tooth by analyzing the CT data, selecting curable print ink droplets, calculating the weight of the desired 3D print ink droplets based on the STL file and the density of the ink droplets, placing the ink droplets with corresponding weight on a surface of a flat curing surface with dewettability, controlling the receiving base to pass through the ink droplets by a movement system such that the lower end surface of the receiving base is brought into proximity with the flat curing surface;

(2) arranging a curing pattern player to project a first curing pattern according to the 3D printing structure of the tooth, a curing medium provided by the curing system passes through the first curing pattern, so that the ink liquid filled between the flat curing surface and the receiving base are cured, so as to form a first cured layer having the first curing pattern; and (3) moving upwards the receiving base, switching a curing pattern of the curing pattern player according to the 3D printing structure of the tooth, projecting a second curing pattern, a curing medium provided by the curing system passes through the second curing pattern, so that the ink liquid filled between the flat curing surface and the first cured layer are cured, so as to form a second cured layer having the second curing pattern.

Moving upwards the receiving base, switching the curing pattern of the cured pattern player according to the 3D printing structure of the tooth, projecting a third curing pattern, a curing medium provided by the curing system passes through the third curing pattern, so that the ink liquid filled between the flat curing surface and the second cured layer are cured, so as to form a third cured layer having the third curing pattern.

Moving upwards the receiving base, switching the curing pattern of the cured pattern player according to the 3D printing structure of the tooth, projecting a fourth curing pattern, a curing medium provided by the curing system passes through the fourth curing pattern, such that the ink liquid filled between the flat curing surface and the third cured layer are cured, so as to form a fourth cured layer having the fourth curing pattern.

The curing pattern player is enabled to project a curing pattern reflecting the different structural layers of the target 3D printed structure, and the curing process is repeated in order to form the 3D printed structure obtained through the layer-by-layer growth.

According to another embodiment of the present disclosure, the above-mentioned process is used for preparing a contact lens, the preparation steps comprising:

(1) analyzing eye morphology parameters of a wearer to calculate a 3D printing STL file of a desired contact lens, selecting curable print ink droplets, calculating the weight of the desired 3D print ink droplets based on the STL file and the density of the ink droplets, placing the ink droplets with corresponding weight on a surface of a flat curing surface with dewettability, controlling the receiving base to pass through the ink droplets by a movement system such that the lower end surface of the receiving base is brought into proximity with the flat curing surface;

(2) arranging a curing pattern player to project a first curing pattern according to the 3D printing structure of the contact lens, a curing medium provided by the curing system passes through the first curing pattern, so that the ink liquid filled between the flat curing surface and the receiving base are cured, so as to form a first cured layer having the first curing pattern; and (3) moving upwards the receiving base, switching a curing pattern of the curing pattern player according to the 3D printing structure of the contact lens, plying a second curing pattern, a curing medium provided by the curing system passes through the second curing pattern, so that the ink liquid filled between the flat curing surface and the first cured layer are cured, so as to form a second cured layer having the second curing pattern.

Moving upwards the receiving base, switching the curing pattern of the cured pattern player according to the 3D printing structure of the contact lens, projecting a third curing pattern, a curing medium provided by the curing system passes through the third curing pattern, so that the ink liquid filled between the flat curing surface and the second cured layer are cured, so as to form a third cured layer having the third curing pattern.

Moving upwards the receiving base, switching the curing pattern of the cured pattern player according to the 3D printing structure of the contact lens, projecting a fourth curing pattern, a curing medium provided by the curing system passes through the fourth curing pattern, such that the ink liquid filled between the flat curing surface and the third cured layer are cured, so as to form a fourth cured layer having the fourth curing pattern.

The curing pattern player is enabled to project a curing pattern reflecting the different structural layers of the target 3D printed structure, and the curing process is repeated in order to form the 3D printed structure obtained through the layer-by-layer growth.

The present disclosure will be specified below with reference to the examples.

Preparation Example 1

7.5 g of a silicone rubber material liquid (commercially available from Dow Corning Corporation with a batch number SYLGARRD 184, wherein a ratio of the initiator to the curing agent is 10:1) was mixed with 0.5 g of heptade-cafluoro-decyl-trimethoxysilane (a fluorine-containing surfactant purchased from Sigma-Aldrich Company) in mechanical agitation to provide a curing plane of cure with dewettability.

Preparation Example 2

10 g of silicone rubber material (commercially available from Dow Corning Corporation with a batch number SYL-GARRD 160, wherein a ratio of the initiator to the curing agent is 6:1) was mixed with 0.1 g of (trifluoromethyl) trimethylsilane (a fluorine-containing surfactant purchased from Acros Company) in mechanical agitation to provide a curing plane of cure with dewettability.

Preparation Example 3

5 g of silicone rubber material (commercially available from Dow Corning Corporation with a batch number SYL-GARRD 170, wherein a ratio of the initiator to the curing agent is 8:1) was mixed with 1 g of triethylfluorosilane (a fluorine-containing surfactant purchased from Accela Company) in mechanical agitation to provide a curing plane of cure with dewettability.

Preparation Example 4

The superomniphobic surfaces with Re-entrant structure was prepared, the specific preparation method was formulated in the reference literature: Tuteja A, Choi W, Ma M, et al. Designing superoleophobic surfaces [J]. Science, 2007, 318 (5856): 1618-1622.

Example 1

(1) The 3D printing STL file of a tooth was obtained by analyzing the computerized tomography (CT), the polyurethane acrylic resin (a photo-curable resin with a weight-average molecular weight of 3,000 and a photosensitive wavelength of 365 nm) was used as ink droplet, the weight of the desired 3D printing ink droplet was measured according to the STL file and the density of the ink droplet; 1.5023 g of the ink droplets was placed on the surface of a flat curing surface with dewettability (obtained from the Preparation example 1), a receiving base was moved downwards by a movement system to pass through the ink droplets, such that the lower end surface of the receiving base was brought into proximity with the flat curing surface, the static contact angle between the ink droplets and the flat curing surface was 42.4±2.1°, and the dynamic contact angle between the ink droplets and the flat curing surface was 3.9±2.1°.

(2) A curing pattern player was arranged to project a first curing pattern according to the 3D printing structure of the tooth, a curing medium provided by the curing system passed through the first curing pattern, so that the ink liquid filled between the flat curing surface and the receiving base were cured, so as to form a first cured layer having the first curing pattern; wherein the photo-curing had a light emission wavelength of 365 nm, the adhesive force between the first cured layer and the flat curing surface was 1 kPa, the adhesive force between the first cured layer and the receiving base was 20 kPa.

(3) The receiving base was moved upwards, a curing pattern of the curing pattern player was switched according to the 3D printing structure of the tooth, a second curing pattern was projected, a curing medium provided by the curing system passed through the second curing pattern, so that the ink liquid filled between the flat curing surface and the receiving base were cured, and a second cured layer having the second curing pattern was formed; wherein the photo-curing had a light emission wavelength of 365 nm, the adhesive force between the second cured layer and the flat curing surface was 1 kPa, the adhesive force between the second cured layer and the first cured layer was 20 kPa; wherein the switching speed of the curing pattern was 1 layer/s, the second cured layer had a thickness of 5 µm/layer, the speed of moving upwards the receiving base was 5 µm/s. The curing pattern player was caused to project a curing pattern reflecting the different structural layers of the target 3D printed structure, and the curing process was repeated in order to form the 3D printed structure of the tooth obtained through the layer-by-layer growth.

The utilization rate of the dry state materials was calculated.

Direct weighing was performed, yielding a 3D printing structure was measured with a weight of 1.4993 g, a calculation was carried out according to formula I, the utilization rate of the dry state materials was 99.8%.

(formula I)

The utilization rate of dry state materials =

$$\frac{\text{the weight of } 3D \text{ printing structure}}{\text{the weight of ink droplets}} \times 100\%.$$

Furthermore, the surface and internal structure of the 3D printing structure were observed by a scanning electron microscope (commercially available from the Japan-based JEOL company with the model number JSM-7500), the prepared 3D printing structure produced had a desirable molding effect, the 3D printing structure had less defect and can be easily cleaned.

Example 2

(1) The 3D printing STL file of a tooth was obtained by analyzing the computerized tomography (CT), the epoxy resin (a thermosetting resin with a weight-average molecular weight of 4,000 and a thermosensitive temperature of 150° C.) was used as ink droplet, the weight of the desired 3D printing ink droplet was measured according to the STL file and the density of the ink droplet; 1.4723 g of the ink droplets was placed on the surface of a flat curing surface with dewettability (obtained from the Preparation example 2), a receiving base was moved downwards by a movement system to pass through the ink droplets, such that the lower end surface of the receiving base was brought into proximity with the flat curing surface, the static contact angle between the ink droplets and the flat curing surface was 39.4±1.8°, and the dynamic contact angle between the ink droplets and the flat curing surface was 5.2±1.4°.

(2) A curing pattern player was arranged to project a first curing pattern according to the 3D printing structure of the tooth, a curing medium provided by the curing system passed through the first curing pattern, so that the ink liquid filled between the flat curing surface and the receiving base were cured, so as to form a first cured layer having the first curing pattern; wherein the temperature of thermal curing was 150° C., the adhesive force between the first cured layer and the flat curing surface was 0.1 kPa, the adhesive force between the first cured layer and the receiving base was 25 kPa.

(3) The receiving base was moved upwards, a curing pattern of the curing pattern player was switched according to the 3D printing structure of the tooth, a second curing pattern was projected, a curing medium provided by the curing system passed through the second curing pattern, so that the ink liquid filled between the flat curing surface and the receiving base were cured, and a second cured layer having the second curing pattern was formed; wherein the temperature of thermal curing was 150° C., the adhesive force between the second cured layer and the flat curing surface was 0.1 kPa, the adhesive force between the second cured layer and the first cured layer was 200 kPa; wherein the switching speed of the curing pattern was 5 layer/s, the second cured layer had a thickness of 10 µm/layer, the speed of moving upwards the receiving base was 50 µm/s. The curing pattern player was caused to project a curing pattern reflecting the different structural layers of the target 3D printed structure, and the curing process was repeated in order to form the 3D printed structure of the tooth obtained through the layer-by-layer growth.

The utilization rate of the dry state materials was calculated.

The utilization rate of the dry state materials was measured to be 96.5% after performing detection according to the method of Example 1.

Upon detection according to the method of Example 1, the prepared 3D printing structure can be easily cleaned, it had a desirable molding effect and less defect.

Example 3

(1) The 3D printing STL file of a tooth was obtained by analyzing the computerized tomography (CT), an aqueous solution of gold chlorate (wherein the gold chlorate was contained in an amount of 5 wt. %) was used as ink droplet, the weight of the desired 3D printing ink droplet was measured according to the STL file and the density of the ink droplet; 1.8934 g of the ink droplets was placed on the surface of a flat curing surface with dewettability (obtained from the Preparation example 3), a receiving base was moved downwards by a movement system to pass through the ink droplets, such that the lower end surface of the receiving base was brought into proximity with the flat curing surface, the static contact angle between the ink droplets and the flat curing surface was 59.4±2.7°, and the dynamic contact angle between the ink droplets and the flat curing surface was 2.2±0.6°.

(2) A curing pattern player was arranged to project a first curing pattern according to the 3D printing structure of the tooth, a curing medium provided by the curing system passed through the first curing pattern, so that the ink liquid filled between the flat curing surface and the receiving base were cured, so as to form a first cured layer having the first curing pattern; wherein the electrical curing related to static electricity with a touch discharge voltage of 20 kV, the adhesive force between the first cured layer and the flat curing surface was 0.5 kPa, the adhesive force between the first cured layer and the receiving base was 5 kPa.

(3) The receiving base was moved upwards, a curing pattern of the curing pattern player was switched according to the 3D printing structure of the tooth, a second curing pattern was projected, a curing medium provided by the curing system passed through the second curing pattern, so that the ink liquid filled between the flat curing surface and the receiving base were cured, and a second cured layer having the second curing pattern was formed; wherein the electrical curing related to static electricity with a touch discharge voltage of 20 kV, the adhesive force between the second cured layer and the flat curing surface was 0.5 kPa, the adhesive force between the second cured layer and the first cured layer was 5 kPa; wherein the switching speed of the curing pattern was 20 layer/s, the second cured layer had a thickness of 1 µm/layer, the speed of moving upwards the receiving base was 20 µm/s. The curing pattern player was caused to project a curing pattern reflecting the different structural layers of the target 3D printed structure, and the curing process was repeated in order to form the 3D printed structure of the tooth obtained through the layer-by-layer growth.

The utilization rate of the dry state materials was calculated.

The utilization rate of the dry state materials was measured to be 94.1% after performing detection according to the method of Example 1.

Upon detection according to the method of Example 1, the prepared 3D printing structure can be easily cleaned, it had a desirable molding effect and less defect.

Example 4

(1) The 3D printing STL file of a tooth was obtained by analyzing the computerized tomography (CT), the polyurethane acrylic resin (a photo-curable resin with a weight average molecular weight of 6,000 and a light-sensitive wavelength of 405 nm) was used as ink droplet, the weight of the desired 3D printing ink droplet was measured according to the STL file and the density of the ink droplet; 3.1245 g of the ink droplets was placed on the surface of a flat curing surface with dewettability (obtained from the Preparation example 4), a receiving base was moved downwards by a movement system to pass through the ink droplets, such that the lower end surface of the receiving base was brought into proximity with the flat curing surface, the static contact angle between the ink droplets and the flat curing surface was 152.4±3.5°, and the dynamic contact angle between the ink droplets and the flat curing surface was 1.2±0.5°.

(2) A curing pattern player was arranged to project a first curing pattern according to the 3D printing structure of the tooth, a curing medium provided by the curing system passed through the first curing pattern, so that the ink liquid filled between the flat curing surface and the receiving base were cured, so as to form a first cured layer having the first curing pattern; wherein the photo-curing had a light emission wavelength of 405 nm, the adhesive force between the first cured layer and the flat curing surface was 0.01 kPa, the adhesive force between the first cured layer and the receiving base was 20 kPa.

(3) The receiving base was moved upwards, a curing pattern of the curing pattern player was switched according to the 3D printing structure of the tooth, a second curing pattern was projected, a curing medium provided by the curing system passed through the second curing pattern, so that the ink liquid filled between the flat curing surface and the receiving base were cured, and a second cured layer having the second curing pattern was formed; wherein the photo-curing had a light emission wavelength of 405 nm, the adhesive force between the second cured layer and the flat curing surface was 0.01 kPa, the adhesive force between the second cured layer and the first cured layer was 135 kPa; wherein the switching speed of the curing pattern was 1 layer/s, the second cured layer had a thickness of 20 μm/layer, the speed of moving upwards the receiving base was 20 μm/s. The curing pattern player was caused to project a curing pattern reflecting the different structural layers of the target 3D printed structure, and the curing process was repeated in order to form the 3D printed structure of the tooth obtained through the layer-by-layer growth.

The utilization rate of the dry state materials was calculated.

The utilization rate of the dry state materials was measured to be 94.9% after performing detection according to the method of Example 1.

Upon detection according to the method of Example 1, the prepared 3D printing structure can be easily cleaned, it had a desirable molding effect and less defect.

Example 5

(1) The 3D printing STL file of a tooth was obtained by analyzing the computerized tomography (CT), the polymethyl methacrylate resin (a photo-curable resin with a weight average molecular weight of 5,000 and a light-sensitive wavelength of 365 nm) was used as ink droplet, the weight of the desired 3D printing ink droplet was measured according to the STL file and the density of the ink droplet; 3.2341 g of the ink droplets was placed on the surface of a flat curing surface with dewettability (obtained from the Preparation example 1), a receiving base was moved downwards by a movement system to pass through the ink droplets, such that the lower end surface of the receiving base was brought into proximity with the flat curing surface, the static contact angle between the ink droplets and the flat curing surface was 59.4±2.7°, and the dynamic contact angle between the ink droplets and the flat curing surface was 2.2±0.6°.

(2) A curing pattern player was arranged to project a first curing pattern according to the 3D printing structure of the tooth, a curing medium provided by the curing system passed through the first curing pattern, so that the ink liquid filled between the flat curing surface and the receiving base were cured, so as to form a first cured layer having the first curing pattern; wherein the photo-curing had a light emission wavelength of 365 nm, the adhesive force between the first cured layer and the flat curing surface was 0.5 kPa, the adhesive force between the first cured layer and the receiving base was 20 kPa.

(3) The receiving base was moved upwards, a curing pattern of the curing pattern player was switched according to the 3D printing structure of the tooth, a second curing pattern was projected, a curing medium provided by the curing system passed through the second curing pattern, so that the ink liquid filled between the flat curing surface and the receiving base were cured, and a second cured layer having the second curing pattern was formed; wherein the photo-curing had a light emission wavelength of 365 nm, the adhesive force between the second cured layer and the flat curing surface was 0.5 kPa, the adhesive force between the second cured layer and the first cured layer was 135 kPa; wherein the switching speed of the curing pattern was 3 layer/s, the second cured layer had a thickness of 10 μm/layer, the speed of moving upwards the receiving base was 30 μm/s. The curing pattern player was caused to project a curing pattern reflecting the different structural layers of the target 3D printed structure, and the curing process was repeated in order to form the 3D printed structure of the tooth obtained through the layer-by-layer growth.

The utilization rate of the dry state materials was calculated.

The utilization rate of the dry state materials was measured to be 94.5% after performing detection according to the method of Example 1.

Upon detection according to the method of Example 1, the prepared 3D printing structure can be easily cleaned, it had a desirable molding effect and less defect.

Example 6

(1) The eye morphology parameters of a wearer was analyzed to calculate a 3D printing STL file of a desired contact lens, the light-curable silicone hydrogel resin (a photo-curable resin with a weight average molecular weight of 3,000 and a light-sensitive wavelength of 365 nm) was used as ink droplet, the weight of the desired 3D printing ink droplet was measured according to the STL file and the density of the ink droplet; 0.5126 g of the ink droplets was placed on the surface of a flat curing surface with dewettability (obtained from the Preparation example 1), a receiving base was moved downwards by a movement system to pass through the ink droplets, such that the lower end surface of the receiving base was brought into proximity with the flat curing surface, the static contact angle between the ink droplets and the flat curing surface was 59.4±2.7°, and the dynamic contact angle between the ink droplets and the flat curing surface was 2.2±0.6°.

(2) A curing pattern player was arranged to project a first curing pattern according to the 3D printing structure of the contact lens, a curing medium provided by the curing system passed through the first curing pattern, so that the ink liquid filled between the flat curing surface and the receiving base were cured, so as to form a first cured layer having the first curing pattern; wherein the photo-curing had a light emission wavelength of 365 nm, the adhesive force between the first cured layer and the flat curing surface was 0.5 kPa, the adhesive force between the first cured layer and the receiving base was 10 kPa.

(3) The receiving base was moved upwards, a curing pattern of the curing pattern player was switched according to the 3D printing structure of the contact lens, a second curing pattern was projected, a curing medium provided by the curing system passed through the second curing pattern, so that the ink liquid filled between the flat curing surface and the receiving base were cured, and a second cured layer having the second curing pattern was formed; wherein the photo-curing had a light emission wavelength of 365 nm, the adhesive force between the second cured layer and the flat curing surface was 0.5 kPa, the adhesive force between the second cured layer and the first cured layer was 10 kPa; wherein the switching speed of the curing pattern was 3 layer/s, the second cured layer had a thickness of 10 μm/layer, the speed of moving upwards the receiving base was 30 μm/s. The curing pattern player was caused to project a curing pattern reflecting the different structural layers of the target 3D printed structure, and the curing process was repeated in order to form the 3D printed structure of the contact lens obtained through the layer-by-layer growth.

The utilization rate of the dry state materials was calculated.

The utilization rate of the dry state materials was measured to be 93.9% after performing detection according to the method of Example 1.

Upon detection according to the method of Example 1, the prepared 3D printing structure can be easily cleaned, it had a desirable molding effect and less defect.

Comparative Example 1

The same method as that of Example 1 was performed to prepare the 3D printing structure, except that the flat curing surface lacks dewettability, the results indicated that the 3D printed structure cannot be formed.

Comparative Example 2

The 3D printing structure was prepared according to the same method as that of CN102627028A, the specific method was as follows: the polyurethane acrylic resin was dispersed in a mixed solution consisting of water and glycerin in a weight fraction ratio of 2:1 to obtain an ink, the obtained ink was then filled in a cartridge of the spray ink printing equipment, and the ink was sprayed by the spray ink printing equipment to a base material with dewettability. The spray ink printing equipment was moved by a movement drive system according to a desired 3D printing structure, so as to finally obtain the 3D printing structure.

The utilization rate of the dry state materials was measured to be 30% after performing detection according to the method of Example 1.

Upon detection according to the method of Example 1, the prepared 3D printing structure had a poor molding effect and many defects.

As can be seen from the results of Examples and Comparative examples, the examples of 3D printed structures produced with the method of the present disclosure can cure the single printing ink droplet to form a 3D printed structure, and the utilization rate of the printing liquid material is high; in a preferred embodiment, for example, in the case where the adhesive force between the cured layer and the flat curing surface is not more than 20 kPa, and the dynamic contact angle between the ink droplet and the flat curing surface is lower than or equal to 30°, the utilization rate of dry state materials (a ratio of the weight of the 3D printed structure to the weight of the ink droplets) may reach 80% or more, and the prepared 3D printed structure can be easily cleaned, the molding result is desirable, and the 3D printed structure has less defect.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The foregoing description of the embodiments of the invention has been presented for the purposes of illustration and description. Each and every page of this submission, and all contents thereon, however characterized, identified, or numbered, is considered a substantive part of this application for all purposes, irrespective of form or placement within the application. This specification is not intended to be exhaustive or to limit the invention to the precise form disclosed. Many modifications and variations are possible in light of this disclosure.

Although the present application is shown in a limited number of forms, the scope of the disclosure is not limited to just these forms, but is amenable to various changes and modifications. The present application does not explicitly recite all possible combinations of features that fall within the scope of the disclosure. The features disclosed herein for the various embodiments can generally be interchanged and combined into any combinations that are not self-contradictory without departing from the scope of the disclosure. In particular, the limitations presented in dependent claims below can be combined with their corresponding independent claims in any number and in any order without departing from the scope of this disclosure, unless the dependent claims are logically incompatible with each other.

What is claimed is:
1. A method of producing a 3D printed structure, the method comprising the following steps:
    (A) providing a 3D printing device comprising:
        a curing system;
        a curing pattern player;
        a flat curing surface with de-wettability; and
        a receiving base capable of moving upwards and away from the flat curing surface;
        the receiving base, the flat curing surface, and the curing pattern player being successively arranged above the curing system;
    (B) placing ink droplets on a surface of the flat curing surface with dewettability, and passing the receiving base through the ink droplets such that a lower end surface of the receiving base is brought into proximity with the flat curing surface;
    (C) causing the curing pattern player to project a curing pattern;
    (D) causing a curing medium provided by the curing system to pass through the curing pattern, so that the ink droplets filled between the flat curing surface and the receiving base are cured, forming a cured layer with the curing pattern;
    (E) moving the receiving base upwards; and
    (F) causing the curing pattern player to project curing patterns that reflect the different structural layers of a target 3D printed structure, and repeating steps (D) and (E), thereby forming a 3D printed structure through a layer-by-layer growth.

2. The method according to claim 1, wherein the adhesion of the cured layer to the flat curing surface is less than 20 kPa.

3. The method according to claim 1, wherein a speed of moving the receiving substrate up is the product of a speed of playing the curing pattern and a thickness of the curing layer, a switching speed of the curing pattern is 1-20 sheets/sec, and a thickness of the cured layer is 1-20 microns/layer.

4. The method according to claim 1, wherein a dynamic contact angle between the ink droplets and the flat curing surface is ≤30°.

5. The method according to claim 1, wherein the curing comprises one or more of photocuring, thermal curing and electric curing.

6. The method according to claim 1, wherein:
the ink droplets are one or more selected from the group consisting of a liquid ink containing free ions, a photo-curable resin, a thermosetting resin and a liquid metal;
the free ions are one or more selected from the group consisting of metal ions, inorganic ions and organic ions, and the liquid ink is an aqueous solution, a non-aqueous solution or a molten salt;
the photosensitive wavelength of the photocurable resin is between 200 nm and 1000 nm;
the thermosetting resin has a heat-sensitive temperature within a range of 30° C.-1,500° C.; and
the liquid metal is one or more of liquid Bi, liquid Sn, liquid Pb, liquid In, and liquid Ga.

7. The method of claim 2, wherein the adhesion of the cured layer to the flat curing surface is less than 15 kPa.

8. The method of claim 2, wherein the adhesive force between the cured layer and the flat curing surface is less than 10 kPa.

9. The method of claim 3, wherein the switching speed of the curing pattern is within a range of 1-5 layer/s, and the thickness of the cured layer is within a range of 5-10 μm/layer.

10. The method of claim 4, wherein the dynamic contact angle between the ink droplets and the flat curing surface is less than or equal to 20°.

11. The method of claim 4, wherein the dynamic contact angle between the ink droplets and the flat curing surface is less than or equal to 10°.

12. The method of claim 5, wherein:
the photo-curing has a light emission wavelength within a range of 300-450 nm;
a curing temperature of the thermal curing is within a range of 30° C.-300° C.; and
conditions of the electrical curing comprise either static electricity with a touch discharge voltage within a range of 8-20 kV, or static electricity with an air discharge voltage within a range of 15-30 kV.

13. The method of claim 6, wherein:
the free ions are one or more selected from the group consisting of gold ions, silver ions, copper ions and iron ions;
the photo-curable resin has a photosensitive wavelength within a range of 300-450 nm; and
the thermosetting resin has a heat-sensitive temperature within a range of 30° C.-300° C.

14. The method of claim 6, wherein:
the photo-curable resin is one or more selected from the group consisting of polymethyl methacrylate, poly-acrylic resin, epoxy acrylic resin, polyurethane acrylic resin, polyester acrylic resin, polyether acrylic resin, phenolic resin, a pre-polymer of acrylonitrile-butadiene styrene copolymer, silicone hydrogel resin, allyl resin and vinyl resin; and
the thermosetting resin is one or more selected from the group consisting of polymethyl methacrylate, poly-acrylic resin, epoxy resin, epoxy acrylic resin, polyure-thane acrylic resin, polyester acrylic resin, polyether acrylic resin, phenolic resin, acrylonitrile-butadiene-styrene resin, silicone hydrogel resin, allyl resin and vinyl resin.

* * * * *